US006688301B1

(12) United States Patent
McNeill

(10) Patent No.: US 6,688,301 B1
(45) Date of Patent: Feb. 10, 2004

(54) BARBECUE ACCESSORY TO SUSTAIN CHARCOAL BURNING AND ITS METHOD OF USE

(76) Inventor: Allen R. McNeill, 871Twin Pine Dr., St. Louis, MO (US) 63122

( * ) Notice: Subject to any disclaimer, the term of this patent is extended or adjusted under 35 U.S.C. 154(b) by 0 days.

(21) Appl. No.: 09/564,131

(22) Filed: May 3, 2000

Related U.S. Application Data

(60) Provisional application No. 60/135,828, filed on May 24, 1999, now abandoned.

(51) Int. Cl.[7] .................................. A47J 37/07
(52) U.S. Cl. .................... 126/25 R; 126/25 B
(58) Field of Search ............... 126/25 R, 25 B, 126/215

(56) References Cited

U.S. PATENT DOCUMENTS

| | | | | |
|---|---|---|---|---|
| 611,376 | A | * 9/1898 | Craig | 126/215 |
| 793,379 | A | * 6/1905 | Jones | 126/215 |
| 3,132,639 | A | 5/1964 | Roberts | |
| 3,309,982 | A | * 3/1967 | Surks | 126/25 R |
| 3,667,449 | A | 6/1972 | Persinger et al. | 126/41 R |
| 4,592,334 | A | 6/1986 | Logan, Jr. | 126/25 B |
| 5,074,279 | A | 12/1991 | Sainsbury | 126/25 B |
| 5,615,666 | A | 4/1997 | Ransom | 126/25 R |
| 5,678,531 | A | 10/1997 | Byers et al. | 126/25 R |
| 6,065,464 | A | * 5/2000 | Zajec | 126/25 R |
| 6,523,463 | B1 | * 2/2003 | Hogle | 126/25 B |

FOREIGN PATENT DOCUMENTS

GB  2253  * 1/1909 ................. 126/215

OTHER PUBLICATIONS

*Grill Lover's Catalog Wide Body Series* by Char–Broil, Published for Summer 1999.
*Weber Owner's Guide* by Weber–Stephen Products Co., Published Mar. 1997.
*Weber Assembly Instructions* for Bar–B–Kettle by Weber–Stephen Products Co., Published 1993.

* cited by examiner

*Primary Examiner*—Sara Clarke
(74) *Attorney, Agent, or Firm*—Thompsonn Coburn LLP

(57) ABSTRACT

A barbecue grill accessory for sustaining charcoal burning in a charcoal barbecue grill has a loop form divider wall with a top and opposite bottom edge. The loop is received into a heat chamber of a charcoal barbecue grill resting on its bottom edge and divides the interior volume of the heat chamber into an inner volume and an outer volume that surrounds the inner volume. The outer volume receives the charcoal, and the divider wall supports the charcoal as it is piled up in the outer volume. The loop also allows the charcoal to be arranged in a path around the loop with a start point and an end point. The charcoal may then be ignited in the outer volume so that the charcoal burns over time through the outer volume along the path from the start point to the end point along the outer periphery of the divider loop.

13 Claims, 2 Drawing Sheets

BARBECUE ACCESSORY TO SUSTAIN CHARCOAL BURNING AND ITS METHOD OF USE

RELATED U.S. APPLICATION DATA

This application claims the benefit of provisional application serial No. 60/135,828, filed May 24, 1999, now abandoned.

BACKGROUND OF THE INVENTION

1. Field of the Invention

The invention relates generally to an apparatus and a method of using the apparatus that controls a prolonged and continuous burning of charcoal in a charcoal burning barbecue grill for slow, low temperature cooking of meat. In particular, the apparatus is a loop form divider wall that is placed in a conventional charcoal barbecue grill to divide the heat chamber of the barbecue grill into inner and outer volumes, the outer volume being a circular volume. Charcoal is placed in the outer volume to create a circular path of charcoal that burns slowly to slow cook and smoke meats.

2. Description of the Related Art

It is well known that various meats, such as beef brisket and pork rump, have a much better taste, flavor, and texture, and provide an improved yield when smoked for a prolonged period of time at lower or controlled cooking temperatures. Conventional charcoal barbecue grills do not provide an adequate means for prolonging the cooking cycle. In these conventional barbecue grills, the charcoal or coals are usually piled in a mound in the center of the heat chamber and ignited. This technique concentrates the heat of the ignited coals and promotes the igniting and burning of all of the coals in the pile. When the coals appear white such that each is sufficiently burning, the coals are spread out in the heat chamber of the barbecue grill, and the grill is placed over the coals so that uniform heat is radiated from the burning coals to the grill. In this process, the coals are generally ignited at the same time so that all the coals reach their maximum heat generating capacity at about the same time. Since the coals are spread uniformly throughout the heat chamber and the structure of the barbecue grill provides a means for radiantly and evenly distributing the heat generated onto the grill, foods may be cooked quickly. However, since the charcoal is usually accumulated around the center of the heat chamber of the barbecue grill, the rate of charcoal burning or the amount of the heat generated from charcoal burning cannot be controlled.

As the charcoal briquets burn, they expend their heat generating capacity and slowly cool. The peak temperature and amount of heat generated in the heat chamber depends largely upon the amount of charcoal burned in the heat chamber. To quicken or slow the rate at which charcoal is consumed, conventional barbecue grills may be provided with air valves to control the amount of air introduced into the heat chamber. Opening and closing of the valves varies the amount of air fed into the chamber. This may quicken or slow the rate at which the charcoal reaches its peak temperature and its maximum heat generating capacity. For cooking some foods, varying these parameters is satisfactory. However, for foods requiring extended cooking times, the adjustment of air valves is often found to be insufficient to slow cook meats at low temperatures for an extended cooking cycle.

In order to sustain charcoal burning at a low temperature heat for a prolonged cooking cycle, it is usually necessary to add new charcoal periodically to the heat chamber during the duration of the cooking time period. Because the grill or cooking surface is usually located above the heat chamber, the grill must first be removed to access the heat chamber and to add charcoal. Understandably, it is very inconvenient to remove the grill to add new coals while the grill is hot and the slow cooking meat is on the grill.

SUMMARY OF THE INVENTION

The apparatus of the present invention overcomes the disadvantages encountered in using conventional charcoal barbecue grills to slow cook and smoke meat and other foods with a reduced heat of charcoal burning over an extended period of time. The present invention provides a divider in the form of a loop that is positioned in the heat chamber of the conventional barbecue grill to support charcoal in a piled ridge around the divider. The loop controls the charcoal briquets so that they burn slowly in a path along the outer periphery of the loop divider.

The present invention provides a charcoal barbecue grill accessory that may be designed to be used in conventional charcoal barbecue grills of various shapes and sizes. The barbecue grill accessory includes a divider having a top edge and a bottom edge spaced apart by a wall. The divider is formed in a closed loop and placed in the heat chamber of the barbecue grill resting on its bottom edge. Typically, the divider forms a circular, vertical wall in the heat chamber that divides the heat chamber into an inner volume bounded by an interior surface of the wall and an outer volume surrounding the exterior surface of the wall and the inner volume. The outer volume is defined by the divider and the housing structure of the barbecue grill in the heat chamber. Charcoal is deposited in the outer volume, supported by the wall and the housing of the barbecue grill. In this way, the charcoal may be piled in a manner to enhance its burning. The charcoal is arranged in a path around the loop form divider around which the charcoal will burn slowly at a reduced temperature over time.

The divider has a flange that extends outwardly from the divider wall exterior surface into the outer volume. The flange separates a beginning end of the charcoal burn path from a finishing end of the charcoal burn path and controls the burning of the charcoal in one direction around the divider wall. The charcoal is ignited and burns over time around the outer volume from one side of the flange to the opposite side of the flange. Thus, the user need not add charcoal to the heat chamber to prolong the cooking cycle. In addition, because the divider wall provides support for the charcoal piled or stacked in a ridge around the divider wall, only a small portion of charcoal in the burn path of the ridge burns at any one time. This enables slow cooking over an extended time at reduced heat.

By arranging the charcoal briquettes on the outer periphery of the divider wall and positioning the food to be cooked toward the center of the divider wall, the food avoids the direct heat emanating from the briquettes that could possibly scorch the food. Instead, the food is grilled and smoked at a reduced temperature by the indirect heat radiating from the burning briquettes.

The divider is provided with spacing tabs extending outward into the outer volume. The spacing tabs together with the flange cooperate to center the partition within the heat chamber. The divider is provided with a plurality of openings through the wall, thus, allowing the outer volume to be in communication with the inner volume to enhance the circulation of air into the outer volume for maintaining the burning of the coals.

BRIEF DESCRIPTION OF THE DRAWINGS

Further objects and features of the invention are revealed in the following detailed description of the preferred embodiment of the invention and in the drawings wherein.

Corresponding reference characters indicate corresponding parts throughout several views of the drawings.

DESCRIPTION OF THE PREFERRED EMBODIMENT

Figure 1:
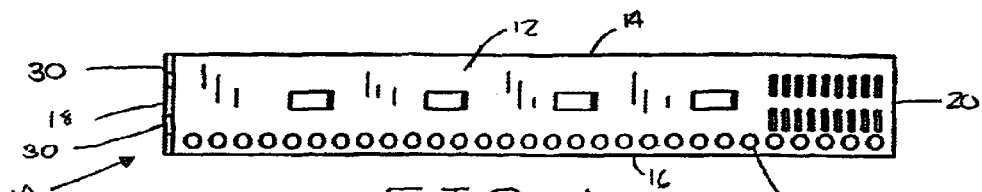
FIG. 1 is a front elevational view of the barbecue grill accessory of the present invention.
Figure 2:
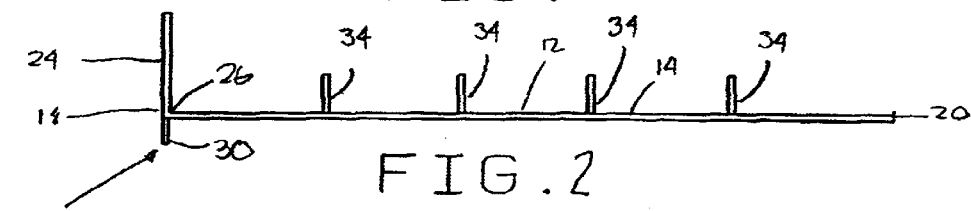
FIG. 2 is a top plan view of the barbecue grill accessory of FIG. 1.

FIGS. 1 and 2 show a general construction of the barbecue grill accessory of the present invention. The barbecue grill accessory 10 is constructed as an elongate, rectangular wall 12 having a top edge 14, an opposite, parallel bottom edge 16, and opposite first 18 and second 20 ends extending perpendicularly between the edges 14,16. Preferably, the vertical height of the wall 12 between the top and bottom edges 14,16 is about 5 inches. The overall horizontal length of the wall between the first and second ends 18,20 is preferably about 65 inches. These dimensions allow the wall 12 to be manipulated into a close loop form 22 shown in FIGS. 3 and 4 that may be used with a 18" or 22½" diameter bowl shaped or kettle shaped barbecue grill 23 shown in FIGS. 5 and 6. However, the dimensions of the wall may be varied as required for use in barbecue grills of different shapes and sizes.

As shown in FIGS. 1 and 2, the first end of the wall 16 is provided with a flange 24. The flange 24 extends perpendicularly away from the wall 12. Preferably, the flange 24 extends between the top and bottom edges 14,16 of the wall 12 so as to have the same vertical height as the wall 12. Preferably, the flange 24 is formed integral with the wall 12 and folded about a fold line 26 to extend outwardly from the wall 12. The flange may also be a separate piece that is attached to the wall using any of a variety of fastening means such as welding or mechanical fasteners.

As shown in FIGS. 1 and 2, the wall 12 is provided with a plurality of circular openings 28 positioned adjacent its bottom edge 16. The plurality of openings 28 permit air flow through the wall 12, as will be explained later. The openings 28 are sized to permit sufficient air flow while maintaining the structural integrity of the wall 12, especially during repeated heat cycles.

As shown in FIGS. 1 and 2, the wall is formed with holding tabs 30 that extend outward and away from the wall 12 in a direction opposite that of the flange 24. Preferably, the holding tabs 30 are formed integral with the wall 12. In this arrangement, the tabs 30 are formed by making two cuts in the flange 24 in a generally "U"-shaped pattern, forming the holding tabs 30 within the cuts, and then bending the holding tabs 30 outwardly away from the wall 12. Preferably, the holding tabs 30 are bent across the same fold line 26 as the flange 24 so that the tabs extends outward from the wall 12 in the same plane as the flange 24.

As shown in FIG. 1, the wall 12 is also provided with a plurality of slots 32 through the wall 12. The slots 32 are arranged in pairs that begin adjacent the second end 20 of the wall and extend toward the first end 18 of the wall. The slots 32 are formed in positions between the top 14 and bottom 16 edges of the wall that correspond to the positions of the holding tabs 30 between the top 14 and bottom 16 edges of the wall. Any one pair of slots is capable of receiving the holding tabs 30 when the first and second ends 18,20 of the wall are brought together and overlapped. Because the tabs are preferably formed adjacent the first end 18 of the wall and the slots pairs of 32 begin adjacent the second end 20 of the wall, the user may form the wall in several different sized loops of different diameters by overlapping the ends of the wall and inserting the tabs 30 into a selected pair of the slots 32.

As shown in FIGS. 1 and 2, the wall 12 is also provided with a plurality of spacing tabs 34. Preferably, the spacing tabs 34 are formed in the same manner as the holding tabs 30, i.e., by making several cuts in the wall 12 in a generally "U"-shape pattern, forming the spacing tabs 34 in the cuts, and then bending the spacing tabs 34 outward away from the wall 12. The number of spacing tabs depends upon the length and shape of the divider wall to be formed. Preferably, the spacing between the tabs is such that the spacing tabs 34 and flange 24 are evenly spaced along the wall 12. The spacing tabs are formed toward the bottom of the wall to minimize their outward extension when the loop form is used in a bowl shaped or kettle shaped barbecue grill having a concave shaped heat chamber.

The wall 12 is preferably made from a sheet of metal capable of withstanding repeated heat cycles. The thickness of the material is preferably sized to allow the wall 12 to be easily rolled into the loop form 22 shown in FIGS. 3 and 4 or arranged in another shape as required by the geometry of the heat chamber of a particular style of barbecue grill. The thickness of the wall 12 is sized to allow the flange 24, the plurality of openings 28, the holding tabs 30, the plurality of slots 32, and the spacing tabs 34 to be easily formed by punching and bending operations. The wall may also be made from other materials such as consumable materials that burn along with the charcoal and do not provide adverse taste to the food being cooked.

Figure 3:
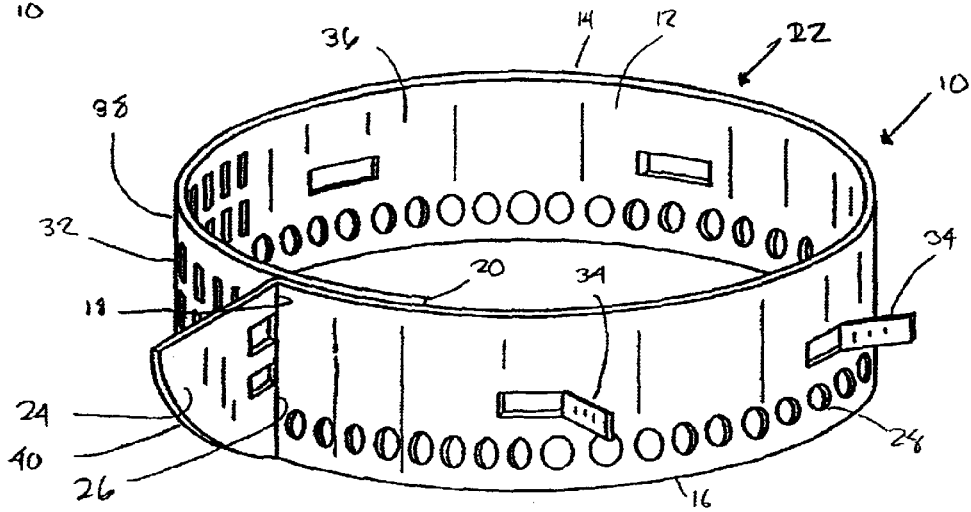
FIG. 3 is a perspective view of the barbecue grill accessory of FIG. 1 formed in a loop.
Figure 4:
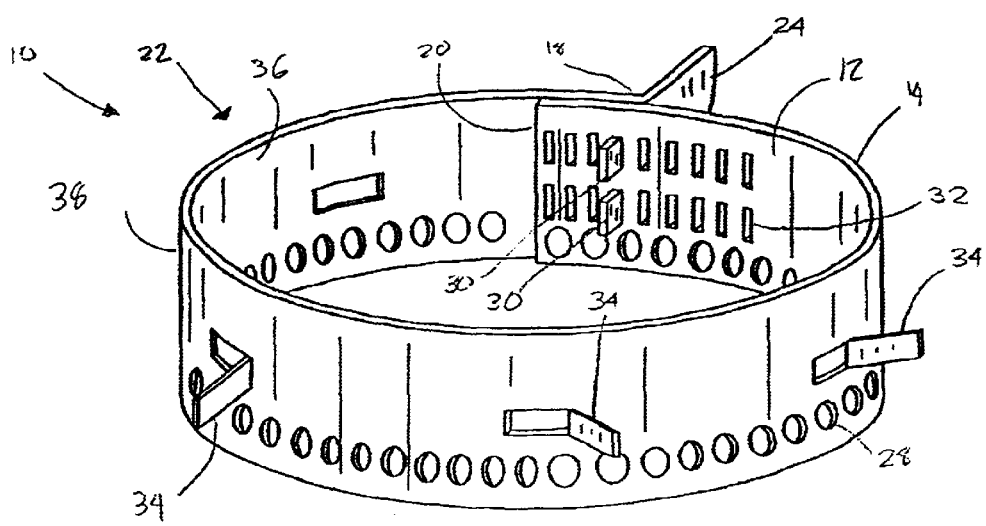
FIG. 4 is a perspective view of the barbecue grill accessory of FIG. 3 turned 180°.

FIGS. 3 and 4 show a general view of the barbecue grill accessory 10 of the present invention when the divider wall 12 has been bowed into the loop form 22. The divider wall 12 formed in the circular loop 22 has an interior surface 36 and an exterior surface 38. The flange 24 and the spacing tabs 34 extend from the exterior surface 38 of the loop 22 while the holding tabs 30 project from the interior surface 36 of the loop 22. To fix the overlapping ends of the wall 12 and maintain the loop 22 in its desired adjusted length or size, the first and second ends 18,20 of the wall 12 are overlapped and held in position by inserting the holding tabs 30 into a pair of slots 32 that set the desired diameter of the loop.

Figure 5:
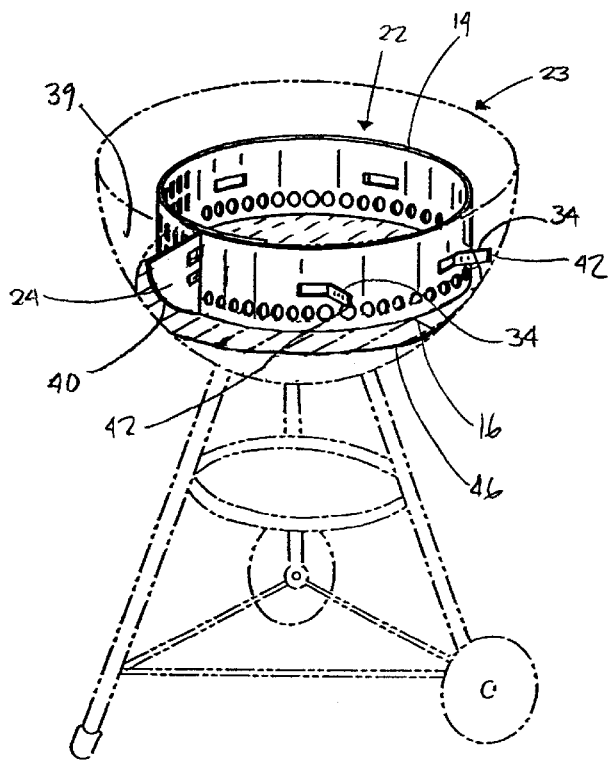
FIG. 5 is a perspective view of the barbecue grill accessory installed in a barbecue grill, the barbecue grill is shown in phantom lines.

As shown in FIG. 5, the barbecue grill accessory 10 may be adjusted as required to fit into a heat chamber 39 of the particular charcoal barbecue grill 23 in which it is to be used.

To adjust the diameter size of the loop 22 shown in FIGS. 3 and 4, the holding tabs 30 are removed from the slots 32 and the ends of the wall 18,20 are moved accordingly to adjust the extent of their overlap and to achieve the proper diameter or shape of the loop 22. The loop form 22, having an adjustable diameter range of roughly 15" to 18", is optimal for use in a 18" or 22½" diameter kettle-shaped or bowl-shaped barbecue grill such as the one depicted in FIG. 5. However, the invention may also be practiced by forming the wall into a rectangular loop or other shaped loop, as required, to conform to the general shape of the heat chamber of a barbecue grill.

To allow the loop form 22 to more readily conform to the contours of the heat chamber 39 of the kettle shaped or bowl shaped barbecue grill, the flange 24 and spacing tabs 34 may each be provided with shaped distal ends 40,42. As shown in FIG. 3, the distal edge 40 of the flange 24 has an arcuate, tapered shape where the outward extension of the flange 24 toward the top edge 14 of the wall 24 is greater than the outward extension of the flange 24 at the bottom edge 16 of the wall 12. This allows the distal edge 40 of the flange 24 to conform to the generally concave shape of the heat chamber 39 of the kettle or bowl shaped barbecue grill. In a similar arrangement, the distal edges 42 of the spacing tabs 34 have a generally arcuate shape that matches and conforms to the general shape of the heat chamber 39. Preferably, the spacing tabs 34 and that portion of the flange 24 that is located at the same relative height from the bottom edge 16 of the wall as the spacing tabs 34 extend outward from the exterior surface 38 of the wall the same distance. In this way, the flange 24 and the spacing tabs 34 set the loop 12 off from the interior surface of the wall 44 of the barbecue grill heat chamber 39.

Figure 6:
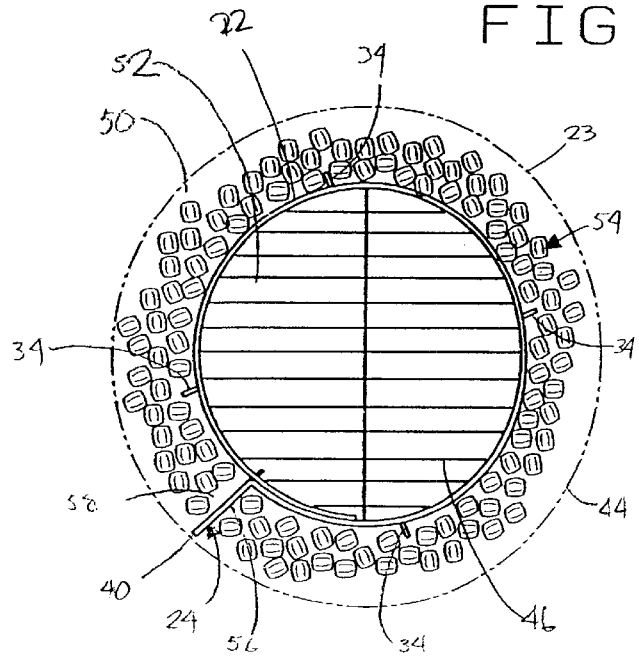
FIG. 6 is a top, plan view of the barbecue grill of FIG. 5 with the barbecue grill accessory received in a heat chamber of the barbecue grill, the barbecue grill is shown in phantom lines.

In setting up the barbecue grill accessory 10 for operation inside the heat chamber 39 of the barbecue grill 23 of FIG. 5, the loop form of the divider wall 12 is adjusted as required to fit inside the heat chamber 39 of the barbecue grill 23. The divider loop 22 may then be placed in the heat chamber 39 of the barbecue grill using the spacing tabs 34 and the flange 24 to center the divider loop 22 in the heat chamber 39 as shown in FIG. 6. The divider loop 22 is rested on its bottom edge 16 on a charcoal support 46. The charcoal support 46 may be either a grate in the bottom of the heat chamber, or an interior surface of the bottom structural wall of the barbecue grill heat chamber. In this arrangement, the divider loop 22 divides the heat chamber 39 into an inner volume inside the divider wall 12 and an outer volume 50 between the exterior surface 38 of the divider wall 12 and the interior surface 44 of the heat chamber 39.

Figure 7:
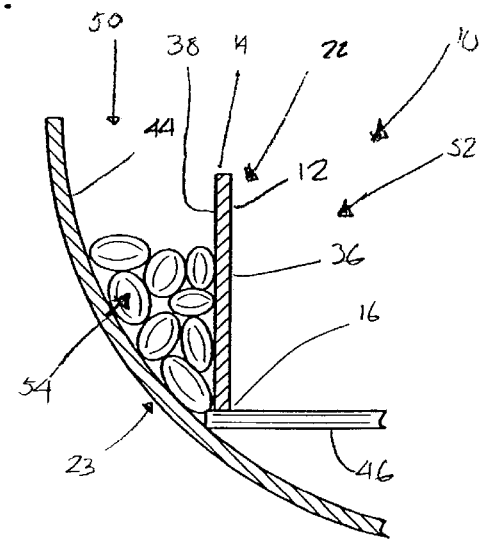
FIG. 7 is a partial, cross sectional view of the barbecue grill accessory installed in the barbecue grill with charcoal briquets stacked against the barbecue grill accessory and a housing of the heat chamber of the barbecue grill.

As shown in FIGS. 6 and 7, charcoal briquets 54 are deposited into the outer volume 50. FIG. 7 shows how the divider wall supports a small number of charcoal briquettes that are stacked or piled on each other to concentrate the heat of burning charcoals and enhance the ignition and burning of other charcoals in the pile. To provide adequate air flow into the outer volume 50 to ignite the charcoal 54, the plurality of openings 28 in the wall 12 permit convection forces to draw air from the inner volume 52 into the outer volume 50 for charcoal burning. In those barbecue grills where the charcoal grate is not provided, the loop form divider may be set in the heat chamber so that the bottom edge 16 of the divider rests on the interior surface of the heat chamber below the cooking grill (not shown). In this arrangement, the plurality of openings 28 will also provide air flow for ignition and sustain burning of the charcoal 54.

In the bowed loop 22 arrangement shown in FIG. 6, the flange 24 extends outward into the outer volume 50 to further segment the outer volume 50. Preferably, the flange 24 extends outward so as to contact the interior surface of the wall 44 of the heat chamber 39. Charcoal 54 is deposited into the outer volume 50 as shown in FIGS. 6 and 7 so that the charcoal 54 forms a continuous path around the outer volume 50. With the flange 24 extending outward into the outer volume 50 as shown in FIG. 6, the flange 24 forms a boundary in the path of the charcoal 54. In this arrangement, the flange 24 creates a start point 56 and an end point 58 for charcoal burning on either side of the flange 24. The start point 56 and end point 58 are adjacent, but separated by the thickness of the flange 24. The flange 24 serves to facilitate the guiding of charcoal burning in one direction around the periphery of the divider loop 22.

The charcoal is ignited at the start point 56 of the charcoal burn path on one side of the flange 24. Over time, the charcoal 54 will burn around the periphery of the divider loop 22 until it reaches the end point 58 on the other side of the flange 24. This arrangement provides a method for continually introducing new charcoal 54 to the burning process to maintain a low temperature heat in the heat chamber 39 to cook foods over a prolonged period of time. The burning of the charcoal in the outer portions of the heat chamber of the barbecue grill indirectly cooks the foods at a low temperature further improving the yield and taste of the meats being grilled.

The heat chamber of the barbecue grill may also be further segmented by arranging several dividers in a concentric pattern with an intermediate volume forming the area for depositing charcoal in a path. In very large barbecue grills having large volume heat chambers, it may be necessary to install a second divider in the heat chamber to further segment the heat chamber and create an intermediate volume concentric with the outer and inner volumes, previously described. This may be preferred where the heat chamber is too large to form an outer volume between the divider and the housing of the heat chamber for the cooking task to be completed. In this case, the intermediate volume may be formed for the cooking task and the size of the loops may be adjusted to control the amount of charcoal in the intermediate volume.

As stated previously, the divider loop 22 may be adjusted in size so that the distal edge 40 of the flange 24 and the distal ends 42 of the spacing tabs 34 contact the walls 44 of the heat chamber 39. In this arrangement, the size of the outer volume 50 is dictated by the preset outward extension of the flange 24 and spacing tabs 34. In an alternative construction, the flange may have an adjustment capability where the flange has a base piece that is rigidly attached to the divider wall and an extension member having a sliding connection to the base piece that enables varying the extension of the flange. This construction gives the user the option to increase the outer volume and add more charcoal to increase the relative temperature during an extended cooking cycle.

Similarly, the spacing tabs may be constructed with a variable adjustment. For instance, the spacing tabs may be separate members with threaded or sliding connections to the divider so that the spacing tabs may be rotated or otherwise moved to achieve the desired length of extension. Preferably, the spacing tabs have a minimal cross section extending outward from the wall so that the spacing tabs do not interfere with the combustion or burning charcoal in the outer volume. The spacing tabs must also be sufficiently constructed so as to withstand the heat generated in the heat chamber during use.

The barbecue grill accessory may also be formed in a loop without a flange where, in use, the start and end points of the charcoal burn path are spatially separated from one another. However, in order to maximize the amount of charcoal deposited in the outer volume, the flange arrangement is preferred for providing support to the charcoal briquets placed in the outer volume.

The barbecue grill accessory may also be configured without a size adjustment capability. In this configuration, the system of cooperating tabs and slots may be used as one of many possible methods of mechanically attaching the first and second ends of the wall together to form the loop form divider.

The divider loop 22 shown in the drawings is of monolithic construction; however, the divider may also be formed by mechanically attaching multiple sections together to form a continuous loop having the required shape. These multiple sections may be joined together by a system of cooperating tabs and slots similar to the arrangement shown in FIGS. 3 and 4, or by other mechanical fastening means known in the art. This arrangement may be preferred when the heat chamber is rectangular in shape and the divider can be constructed from 4 independently joined panels. To simplify packaging requirements and to reduce stocking areas in retail stores, the larger divider loop 22 may be formed from smaller, individual panels that may be assembled for use to form the larger divider loop 22 shown in the Figures. As various changes could be made in the above construction without departing from the scope of the invention, it is intended that the above description and accompanying drawings be interpreted as illustrative and not in any limiting sense. The invention therefore shall be solely limited by the scope of the claims set forth below.

What is claimed is:

1. A barbecue grill accessory to sustain charcoal burning in a charcoal barbecue having at least a bottom structural wall surrounding a heat chamber of the charcoal barbecue, the barbecue grill accessory comprising:

a divider wall that is formed in a loop with opposite interior and exterior surfaces of the divider wall and opposite top and bottom edges of the divider wall, the divider wall is dimensioned to be received inside the heat chamber of the charcoal barbecue and divide an interior volume of the heat chamber into an inner volume inside the divider wall interior surface and an outer volume outside the divider wall exterior surface; and a flange projecting outwardly from the divider wall exterior surface to an extent where the flange engages against the bottom structural wall of the charcoal barbecue when the divider is inserted into the heat chamber of the charcoal barbecue and thereby defines a burning path of charcoal in the outer volume around the exterior surface of the divider wall from a beginning of the burning path adjacent one side of the flange to an end of the burning path adjacent an opposite side of the flange.

2. The barbecue grill accessory of claim 1, wherein: the divider wall and the flange are one monolithic piece of material.

3. The barbecue grill accessory of claim 1, wherein: the loop of the divider wall is circular.

4. The barbecue grill accessory of claim 1, wherein: a plurality of spacing tabs project outwardly from the exterior surface of the divider wall, each spacing tab of the plurality of spacing tabs has a length that spaces the divider wall at the spacing tab from the bottom structural wall of the charcoal barbecue thereby defining the outer volume when the divider is received inside the heat chamber.

5. The barbecue grill accessory of claim 4, wherein: the divider wall, the flange and the plurality Of spacing tabs are all one monolithic piece of material.

6. The barbecue grill accessory of claim 1, wherein: the divider wall has opposite ends that overlap and create the loop form of the divider wall, and adjusting an extent to which the opposite ends of the divider wall overlap adjusts a length of the loop form of the divider wall and adjusts the inner volume and outer volume.

7. The barbecue grill accessory of claim 6, wherein: one of the opposite ends of the divider wall has a plurality of slots and the other of the opposite ends of the divider wall has at least one holding tab that is engageable in any one of the plurality of slots to hold the divider wall in the loop form of the divider.

8. A method of prolonging charcoal burning in a heat chamber of a charcoal barbecue grill, the method comprising:

providing a divider wall in a form of a loop, the divider wall having opposite interior and exterior surfaces and opposite top and bottom edges extending around the loop;

positioning the divider wall on its bottom edge in the heat chamber of the charcoal barbecue where the divider wall divides an interior volume of the heat chamber into an inner volume inside the interior surface of the divider wall and an outer volume outside the exterior surface of the divider wall and surrounding the inner volume;

arranging charcoal in the outer volume in a path around the divider wall exterior surface from a beginning of the path to an end of the path that is separated from the beginning of the path; and, igniting the charcoal in the outer volume at the beginning of the path whereby the charcoal burns over time through the outer volume and around the divider wall exterior surface from the beginning of the charcoal path to the end of the charcoal path.

9. The method of claim 8, further comprising: forming the loop of the divider wall as a circular loop.

10. The method of claim 8, wherein: the step of positioning the divider wall in the heat chamber where the divider wall divides the interior volume of the heat chamber into the inner volume and the outer volume includes adjusting a length of the loop form of the divider wall thereby adjusting the inner volume and outer volume.

11. The method of claim 8, further comprising:

providing a flange on the divider wall that projects outwardly from the exterior surface of the divider wall into the outer volume of the heat chamber with the divider wall positioned in the heat chamber; and arranging the charcoal in the outer volume with the beginning of the charcoal path on one side of the flange and the end of the charcoal path on an opposite side of the flange.

12. The method of claim 8, wherein:

the heat chamber of the charcoal barbecue grill has at least a bottom structural wall and the step of positioning the divider wall in the heat chamber includes placing the divider wall bottom edge on the bottom structural wall of the heat chamber.

13. The method of claim 8, wherein:
the heat chamber of the charcoal barbecue grill has a charcoal supporting grate in the heat chamber and the step of positioning the divider wall in the heat chamber includes placing the divider wall bottom edge on the charcoal supporting grate.

* * * * *